(12) United States Patent
Burroughs et al.

(10) Patent No.: US 6,580,846 B1
(45) Date of Patent: Jun. 17, 2003

(54) ACTIVELY-CONTROLLABLE OPTICAL SWITCHES BASED ON OPTICAL POSITION SENSING AND APPLICATIONS IN OPTICAL SWITCHING ARRAYS

(75) Inventors: Alan C. Burroughs, San Jose, CA (US); Leroy Volz, San Jose, CA (US); Warren Dalziel, Monte Sereno, CA (US); Roger A. Hajjar, San Jose, CA (US); Frank Whitehead, Orangevale, CA (US)

(73) Assignee: Versatile Optical Networks, Inc., San Jose, CA (US)

( * ) Notice: Subject to any disclaimer, the term of this patent is extended or adjusted under 35 U.S.C. 154(b) by 0 days.

(21) Appl. No.: 09/715,847

(22) Filed: Nov. 17, 2000

Related U.S. Application Data
(60) Provisional application No. 60/207,643, filed on May 26, 2000, provisional application No. 60/209,915, filed on Jun. 6, 2000, provisional application No. 60/211,693, filed on Jun. 14, 2000, and provisional application No. 60/241,727, filed on Oct. 18, 2000.

(51) Int. Cl.$^7$ ................................................. G02B 6/42
(52) U.S. Cl. .......................... 385/16; 385/17; 385/18; 385/24; 385/89; 356/153
(58) Field of Search ................................. 385/16–20, 24, 385/12–13, 89–90; 356/153–156

(56) References Cited

U.S. PATENT DOCUMENTS

| | | | |
|---|---|---|---|
| 4,365,863 A | 12/1982 | Broussaud | |
| 5,524,153 A | 6/1996 | Laor | |
| 6,097,858 A | 8/2000 | Laor | |
| 6,210,401 B1 * | 4/2001 | Lai | ............................ 351/209 |
| 6,344,912 B1 | 2/2002 | Hajjar et al. | |

FOREIGN PATENT DOCUMENTS

JP          05-107485          4/1993

* cited by examiner

Primary Examiner—Robert H. Kim
Assistant Examiner—George Wang
(74) Attorney, Agent, or Firm—Fish & Richardson P.C.

(57) ABSTRACT

Controllable optical switches in response to feedback signals from optical position sensors that measure switch orientations. The optical position sensors may include local sensors that monitor and measure orientations of individual switches and global sensors that monitor and measure overall alignment of signal beams. Such switches may be used to form non-blocking switching arrays.

29 Claims, 16 Drawing Sheets

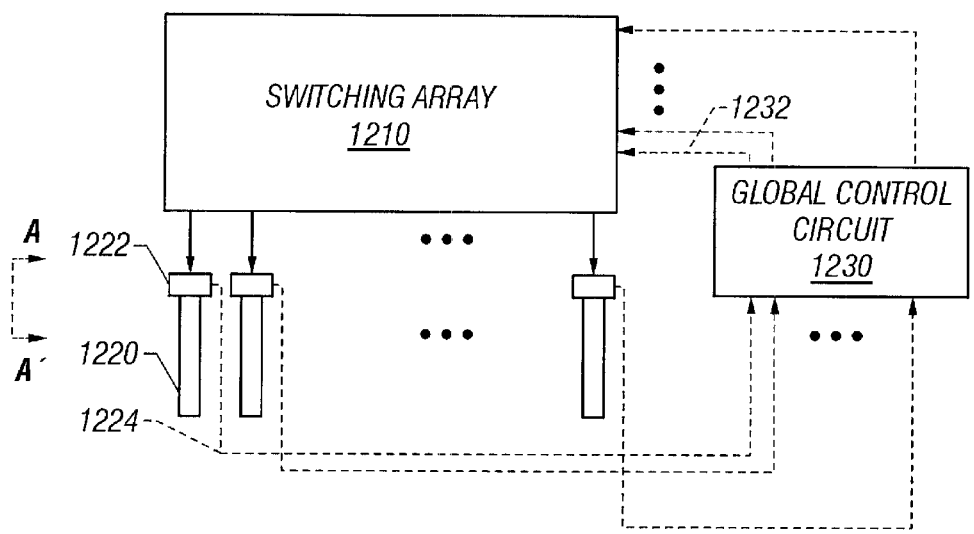
FIG. 12
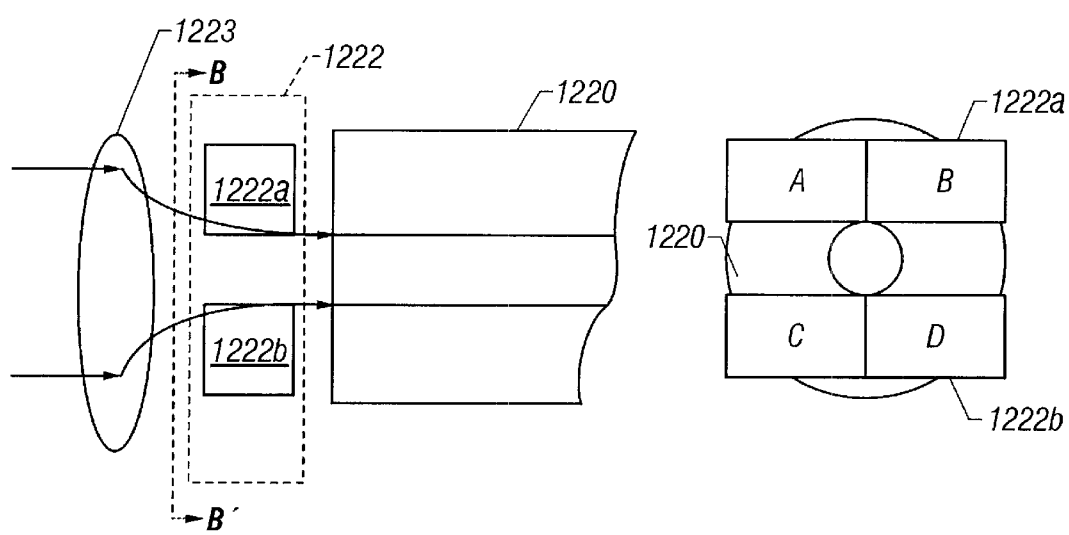
FIG. 12A  FIG. 12B

ACTIVELY-CONTROLLABLE OPTICAL SWITCHES BASED ON OPTICAL POSITION SENSING AND APPLICATIONS IN OPTICAL SWITCHING ARRAYS

This application claims the benefits of U.S. Provisional Application No. 60/207,643, filed May 26, 2000, U.S. Provisional Application No. 60/209,915, filed Jun. 6, 2000, U.S. Provisional Application No. 60/211,693, filed Jun. 14, 2000, and U.S. Provisional Application No. 60/241,727, filed Oct. 18, 2000.

BACKGROUND

This application relates to optical switches, and more particularly, to optical switches for various optical devices and systems, including optical communication and networking devices and systems.

An optical switch may include a device to direct at least one optical beam from one direction of propagation to another direction of propagation. One or more such optical switches may be used in various optical communication modules or systems to route optical signal beams to their respective destinations. One exemplary application of optical switches is to reconfigure light paths to form new light paths when needed. In another example, such a switch may be used to perform protection switching in which, when a fiber link fails, the beam directed thereto is re-routed to a backup fiber link. Optical switching is important in optical WDM modules and systems since a single fiber link is used to simultaneously transmit optical carriers of different wavelengths to accommodate a large number of optical channels.

Multiple optical switches may be used to form a switching array to switch and direct an array of input optical beams to their respective outputs. Such an optical switching array may be designed to perform blocking switching and non-blocking switching. In a blocking switching array, when a first beam is directed to a selected output, another beam can be switched to only certain outputs and are blocked from reaching other outputs. In a non-blocking switching array, any input beam can be switched to reach any output. It is desirable to use non-blocking switching arrays to provide flexibility and versatility in directing optical beams in optical WDM communication systems and other optical systems that implement optical switching from multiple inputs to multiple outputs.

SUMMARY

An optical switch according to one embodiment includes a switching element, an optical position sensor, and a control unit. The switching element is operable to direct an optical signal beam to one or more switching directions. The optical position sensor uses an optical servo beam to measure a property of the switching element to produce a position signal indicative of a deviation between an actual switching direction and a desired switching direction of the signal beam. The control unit is operable to respond to the position signal to control the switching element to reduce the deviation so that the signal beam can be substantially in the desired switching direction.

The optical switch may also include an optical terminal having an optical aperture to receive the signal beam directed from the switching element, and another optical position sensor coupled to the optical terminal to measure a position of the signal beam on the optical aperture to produce a second position signal. The switching element may be operable to respond to the second position signal to further control the actual switching direction of the signal beam so that the signal beam is directed to a desired position on the optical aperture.

BRIEF DESCRIPTION OF DRAWINGS

FIGS. 12, 12A, 12B, 13, 14, 14A, 14B, and 15 show exemplary switching systems that use designated global optical servo beams to implement the global optical position sensing.

DETAILED DESCRIPTION

Optical switch designs and switching techniques of the present disclosure include optical switching arrays having adjustable reflectors that are coupled to their respective positioning actuators and are actively controllable to direct optical beams in free apace. For example, multiple optical beams from one set of input terminals such as input fibers may be directed to a set of receiving terminals such as output fibers through one or more optical switching arrays. A local optical position sensing mechanism can be implemented to monitor any deviation in the orientation of each individual reflector from a desired orientation at which an optical beam directed by that reflector is properly aligned. A servo optical beam may be used to monitor and measure the orientation of each reflector. This servo optical beam may be a separate beam that does not carry communication data and is independent of the signal beam to be switched by the reflector.

Hence, a local servo control mechanism can be formed in each reflector to control the actuator for each reflector, in response to a corresponding deviation indicator signal from the local optical sensor, to compensate for positioning errors in each reflector. In addition, a global optical sensing mechanism may be used to monitor and measure the overall alignment of a signal beam from a switching array to provide a fine positioning information for the switching elements involved in directing that signal beam so that one or more of those switching elements may be adjusted to finely align the signal beam.

Each switching array may be designed to use at least two different switching elements to direct any optical beam received from an input terminal, e.g., an input fiber port, to reach a desired output terminal. This arrangement, in combination of the local servo, the global servo, or both, can be used to achieve reliable and accurate optical alignment in each switching operation.

Figure 1A:
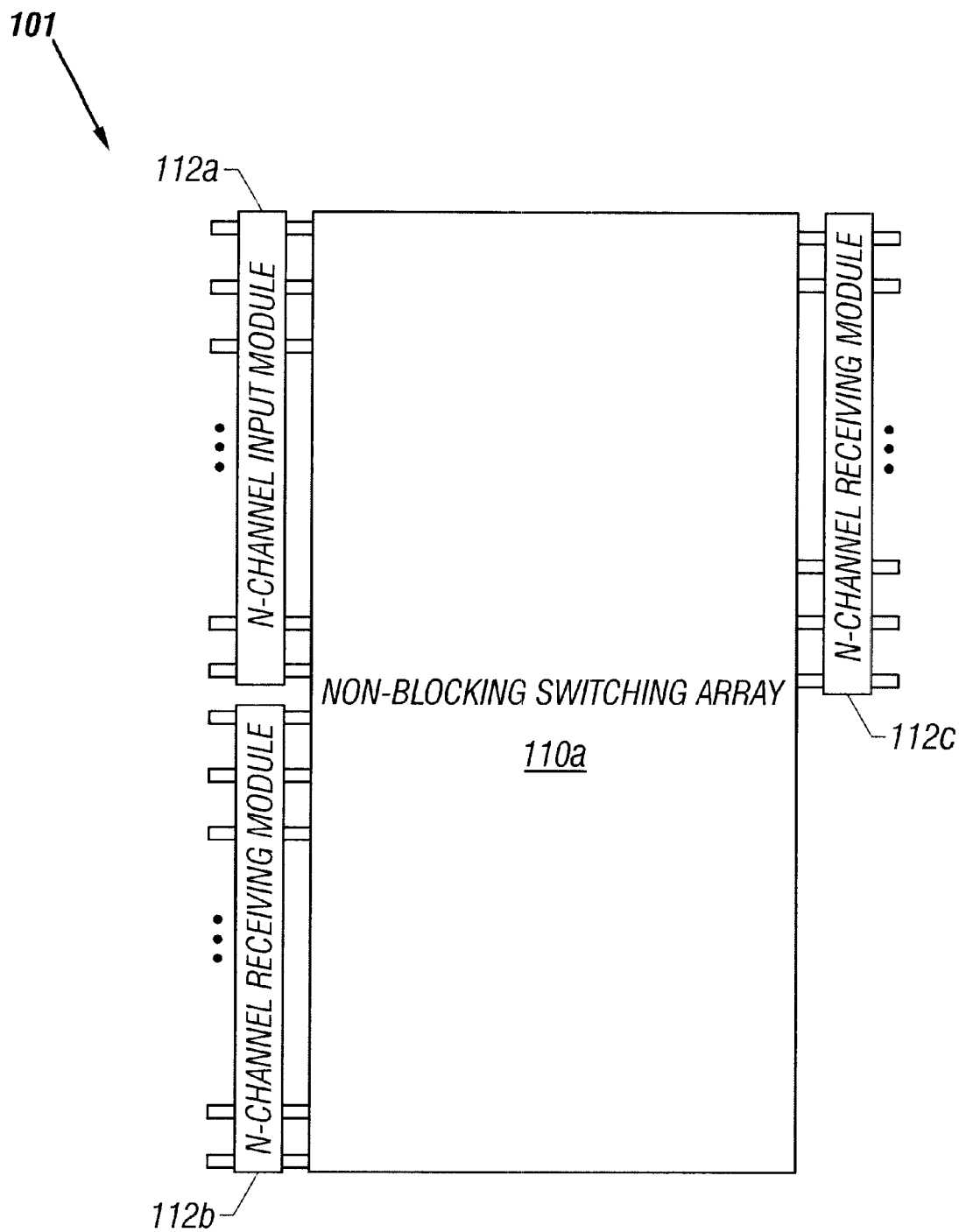
FIGS. 1A, 1B, and 1C show exemplary non-blocking switching arrays and respective arrangements in their input and output fiber modules.
Figure 1B:
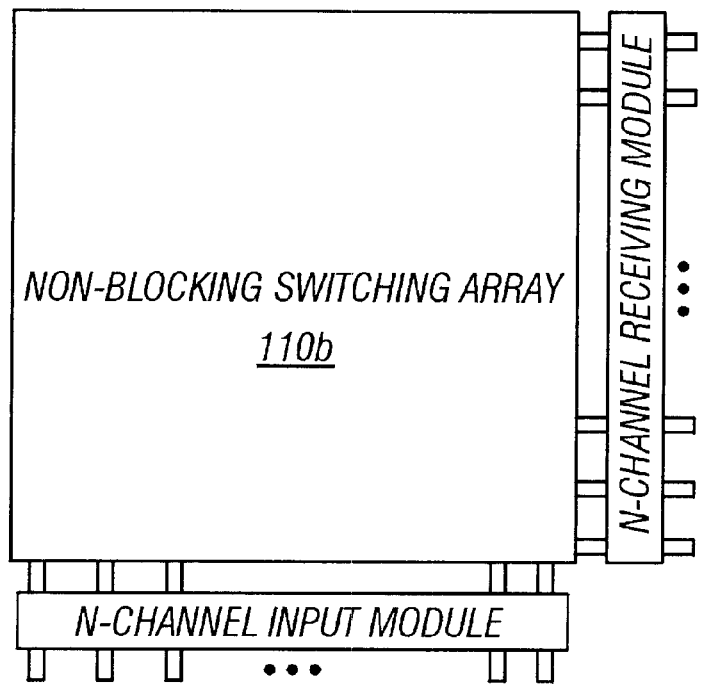
Figure 1C:
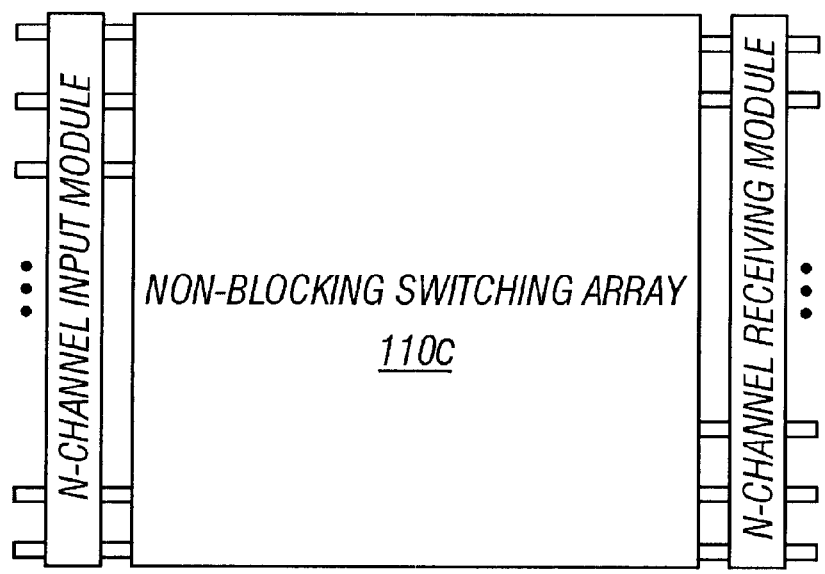

Such controllable switches may be generally used to form either blocking or non-blocking switching arrays. FIGS. 1A, 1B, and 1C illustrate three different exemplary configurations 101, 102, and 103 for arranging input and output terminals that are coupled to a non-blocking switching array.

In FIG. 1A, a non-blocking switching array 110a is arranged to allow a N-channel input module 112a with N input optical terminals and another N-channel receiving module 112b with N receiving terminals to locate side by side on one side of the switching array 110a. An input terminal may be a number of devices, such as a signal laser or an input fiber. An output terminal may be a photodetector or an output fiber. Input fibers coupled to the input module 112a and output fibers coupled to the output module 112b may be substantially parallel so that the entire switch 101 can be conveniently inserted into a slot of a control rack that has slots to mount other optical or electronic modules for an optical fiber communication system. In a non-blocking design, any input optical channel received by the input module 112a may be switched to any output terminal in the receiving module 112b.

Each of the input and receiving modules 112a and 112b may also be bi-directional to operate both as input and output optical channels. Furthermore, at least another input or output N-channel module 112c may be coupled to the switching array 110a so that any input from the module 112a may be switched to any output of the module 112c.

FIGS. 1B and 1C show alternative configurations 102 and 103 with non-blocking switching arrays 110b and 110c, respectively. The input fibers and the output fibers are arranged in a 90-degree configuration in FIG. 1B and are placed in two opposing sides of the switching array 110c in FIG. 1C.

Any of the above switching arrays generally includes multiple switching elements, each of which may include an adjustable reflector for re-directing an optical beam. A positioning actuator may be coupled to the reflector to control the orientation of the reflector in at least two ways. First, the actuator can set the reflector at two or more predetermined orientations for switching operations. Secondly, the actuator is operable to adjust the reflector around each predetermined orientation to optimize the alignment of the optical beam directed thereby.

Actuators for the reflectors may be one-dimensional (1D) actuators that are operable to rotate their respective reflectors around a single rotation axis, or two-dimensional (2D) actuators that are operable to rotate their respective reflectors with respect to two different rotation axes (e.g., two orthogonal axes). Such 1D or 2D actuators may be implemented in a variety of configurations, including galvanometer actuators and micro-electro-mechanical systems (MEMS) fabricated on semiconductor wafers.

Figure 2A:
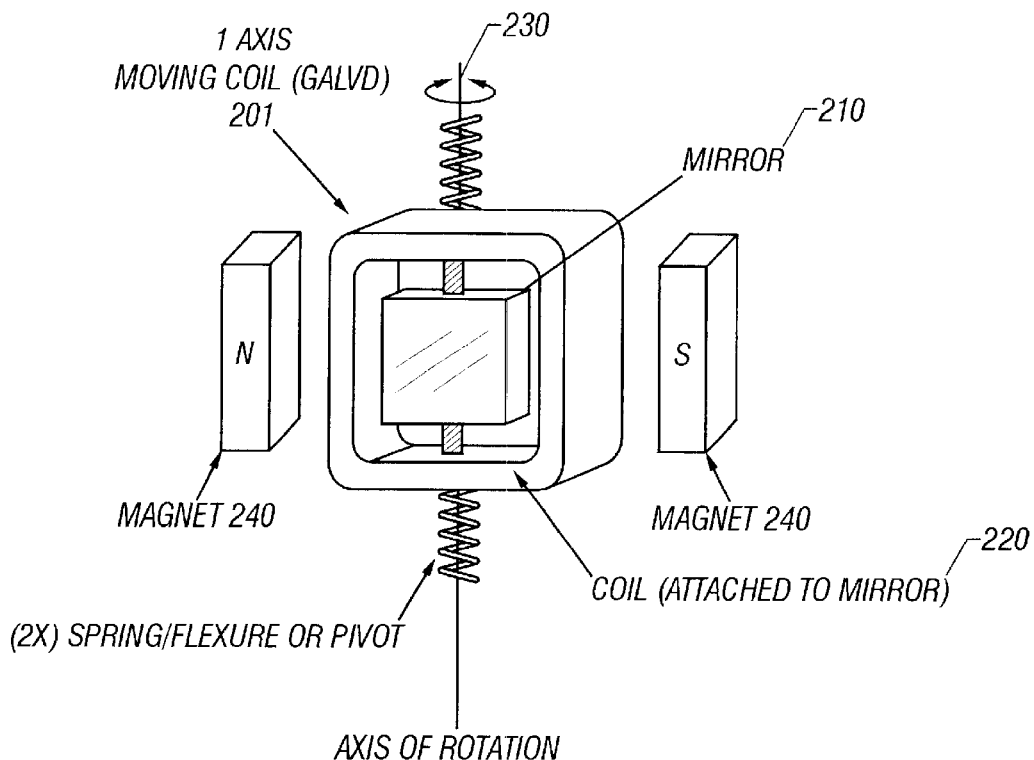
FIGS. 2A, 2B, and 2C show examples of 1D and 2D actuators based on galvanometers.
Figure 2B:
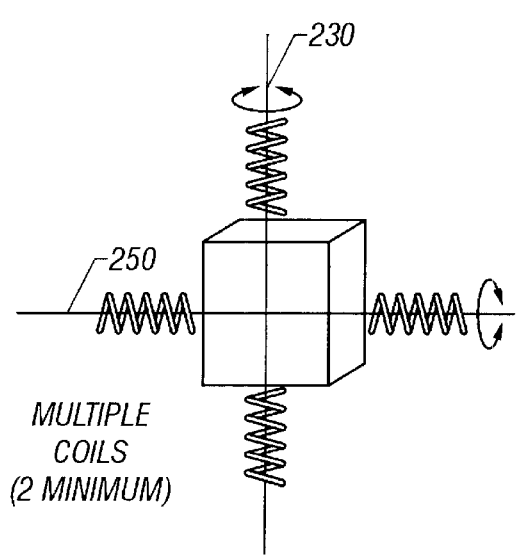
Figure 2C:
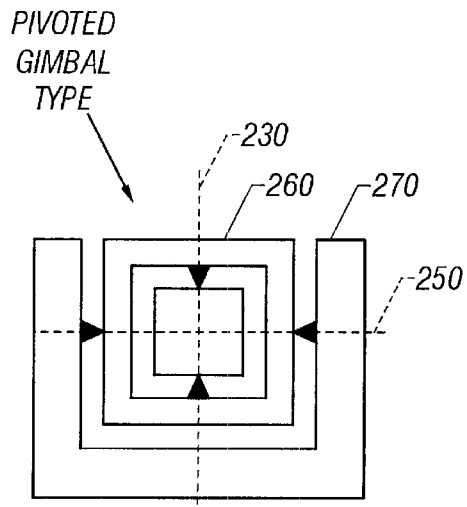

FIGS. 2A, 2B, and 2C illustrate exemplary 1D and 2D galvanometer actuators that may be used in optical switches. A galvanometer operates based on a magnetic force between a conductive coil carrying an electric current and a magnet assembly. FIG. 2A shows an example of a 1D galvanometer actuator 201 in which a reflector 210 is affixed to a coil 220. The coil-reflector assembly is mounted to a spring, a resilient flexure, or pivot to rotate around a single axis 230. A magnetic assembly 240 is used to generate a proper magnetic field pattern at the coil 220 to cause the rotation. The direction and the magnitude of the electric current in the coil 220 can be adjusted to control the orientation of the coil-reflector assembly.

FIGS. 2B and 2C show two exemplary configurations for 2D galvanometer actuators. At least two independent coils are used to respectively cause rotations around two orthogonal rotation axes 230 and 250. The design in FIG. 2B uses a spring or flexure mechanism to implement each of the two rotation axes. The design in FIG. 2C uses a pivoted gimbal configuration in which the coil-reflector assembly is suspended in a frame 260 to rotate around the first axis 260 and the frame 260 is suspended in another frame 270 to rotate around the second axis 250.

A switching array, such as the switching arrays 101, 102, and 103 shown in FIGS. 1A, 1B, and 1C, may be designed to provide two or more switching elements in each optical path within the switching array to allow for a sufficient number of degrees of freedom in adjusting the direction of each signal beam. For example, the direction of a signal beam directed to a receiving optical terminal in a switching array may be adjusted in at least four different degrees of freedom at the receiving optical aperture of the terminal, such as the input fiber facet of a receiving fiber or photodetector.

Figure 3:
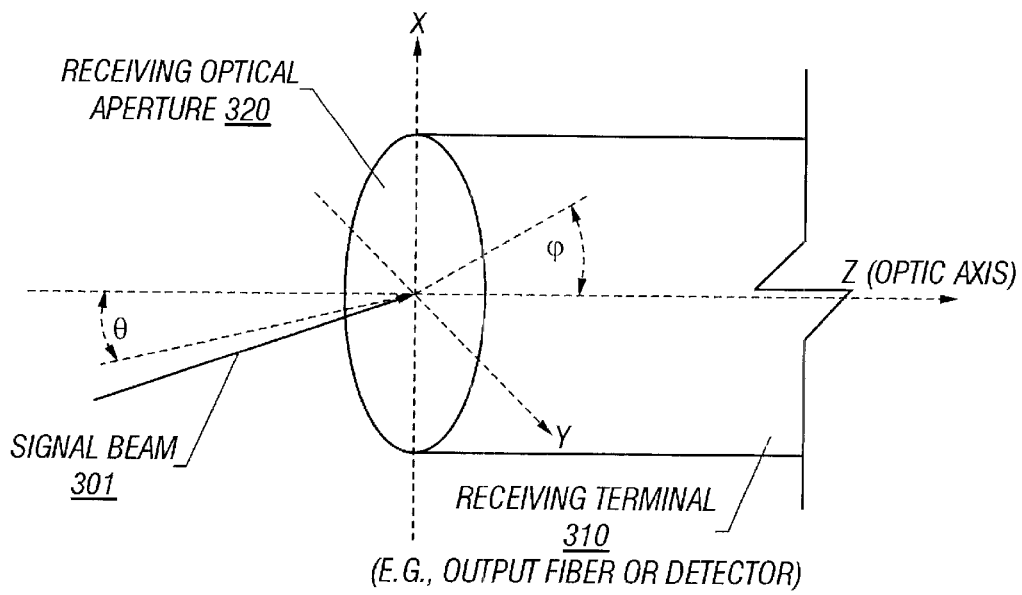
FIG. 3 illustrates degrees of freedom in directing a signal beam into a receiving optical terminal.

FIG. 3 shows the four degrees of freedom in alignment of a signal beam 301 incident to a receiving optical aperture 320 of a receiving terminal 310 in a switching array. There are two degrees of freedom in translational adjustments along two orthogonal directions x and y on the optical aperture 320 in the xy plane. The other two degrees of freedom are angular adjustments in the azimuth angle $\theta$ in the yz plane around the x axis as azimuth rotation axis and an elevation angle $\phi$ in the vertical xz plane around the y axis as the elevation axis. All terminals in the input and receiving modules 401 and 402 are located within the yz plane. A switching array may be arranged to have at least four separate 1D reflectors in each optical path, or a combination of at least one 2D reflector and two 1D reflectors, or a combination of at least two 2D reflectors.

Figure 4:
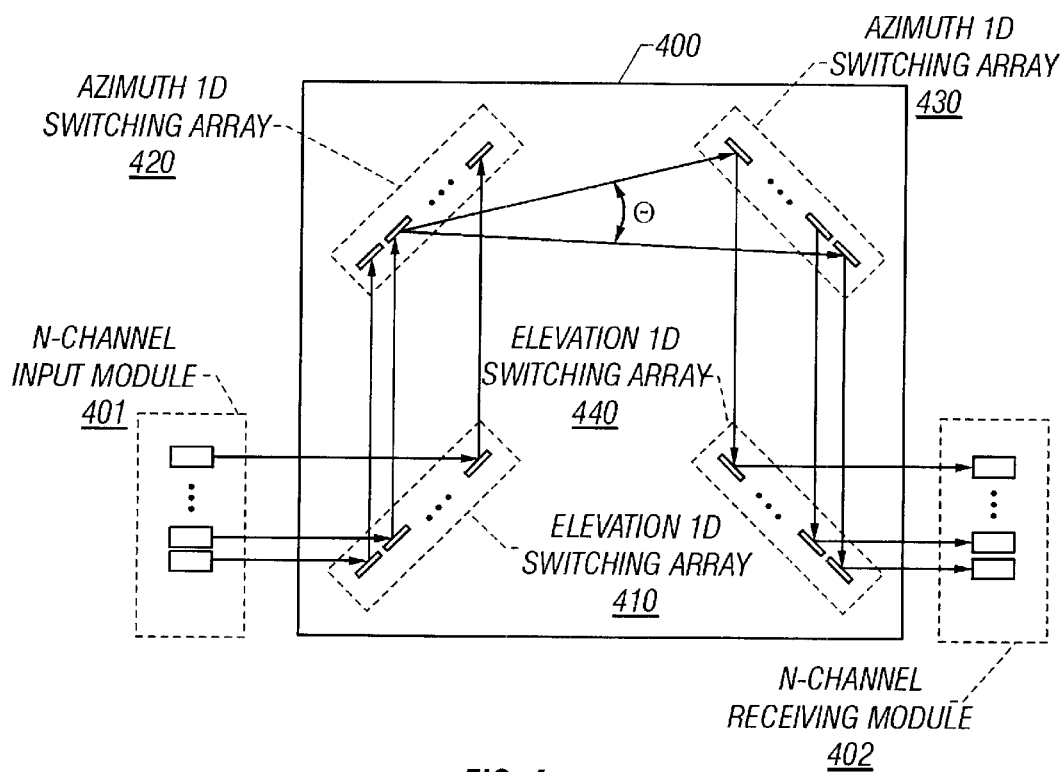
FIGS. 4, 5, and 6 show three examples of non-blocking switching arrays.

FIG. 4 illustrates an exemplary switching array 400 based on 1D actuators in all reflectors in a non-blocking configuration. An input module 401 and a receiving module 402 with the same number (N) of terminals are coupled to the switching array 400. The switching array 400 includes 4N switching elements with 1D actuators that are arranged in 4 linear switching arrays 410, 420, 430, and 440 each with N switching elements. Two reflectors within the same linear switching array do not receive a signal beam from or send a signal beam to each other. Each signal beam is reflected four times by four different reflectors respectively in the four linear switching arrays 410 through 440 to provide the four degrees of freedom in alignment.

Two linear switching arrays, 410 and 4430, are positioned to respectively receive input signals from the input module 401 and to send the switched signals to the receiving module 402. One switching element in each of the arrays 410 or 440 only receives a signal beam from or sends a signal beam to a designated terminal in the input module 401 or the receiving module 402 as illustrated. In addition, each switching element in the array 410 only receives a signal beam from or sends a signal beam to a designated switching element in the array 420. Similarly, each switching element in the array 440 only receives a signal beam from or sends a signal beam to a designated switching element in the array 430. Furthermore, each 1D switching in the arrays 410 and 440 can change the direction of a signal beam in the elevation direction as defined in FIG. 3.

The linear switching arrays 420 and 430 are formed of 1D switching elements that change the directions of their respective signals beams in the azimuth direction as defined in FIG. 3. In particular, the arrays 420 and 430 are positioned relative to each other to allow any reflector in one of the arrays 420 and 430 to receive a signal beam from or send a beam from to any one of N switching elements in the other array. Hence, for a given angular scanning range 1 for each reflector, the linear switching arrays 420 and 430 should be spaced and positioned so that each switching element in one linear switching array is within the field of view of each switching element of another linear switching array, such as between arrays 410 and 420, between arrays 420 and 430. Therefore, the linear switching arrays 420 and 430 are used to perform the actual switching operations in the system 400. All four 1D arrays 410 through 440, however, are used to align the signal beams.

Figure 5:
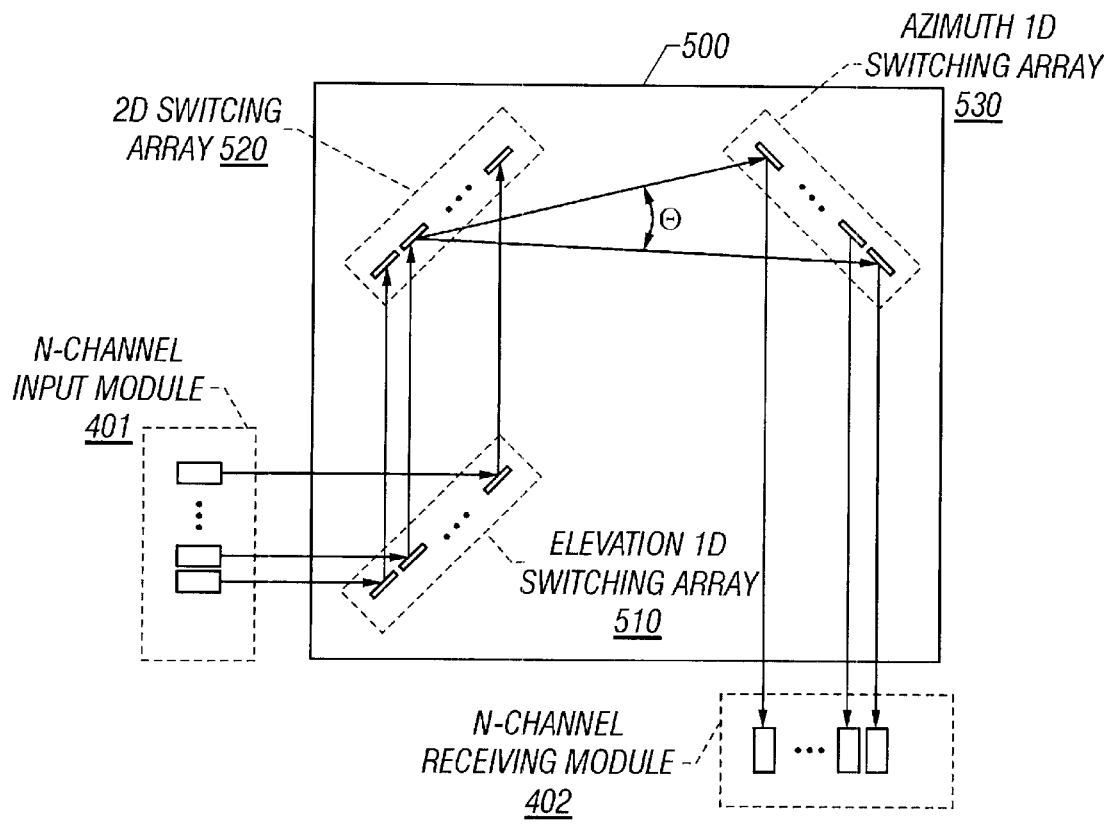
Figure 6:
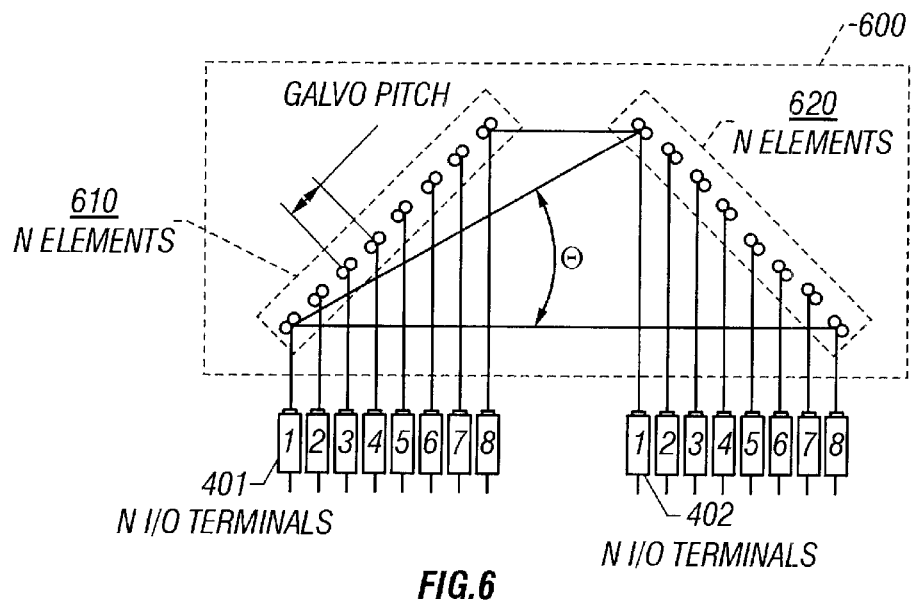

FIG. 5 shows another non-blocking switching array 500 with three linear switching arrays 510, 520, and 530, two of which, e.g., 510 and 530, have 1D reflectors in two orthogonal directions, and one of which, e.g., 520 has 2D reflectors. FIG. 6 shows yet a third example of a non-blocking switching array 600 having two 2D N-element linear switching arrays 610 and 620 so that each beam is reflected only twice by two different switching elements. Hence, using 2D reflectors can reduce the number of switching elements needed. In addition, using 2D reflectors can improve the alignment tolerance for a given size of the receiving optical aperture in each switching element. For example, any alignment error caused by a small is angular error may be amplified in displacement by the total traveling distance of each beam for using 1D linear switching arrays.

The switching arrays 400, 500, and 600 may operate bi-directionally to switch channels from the I/O module 401 to the I/O module 402 or vice versa.

Figure 6A:
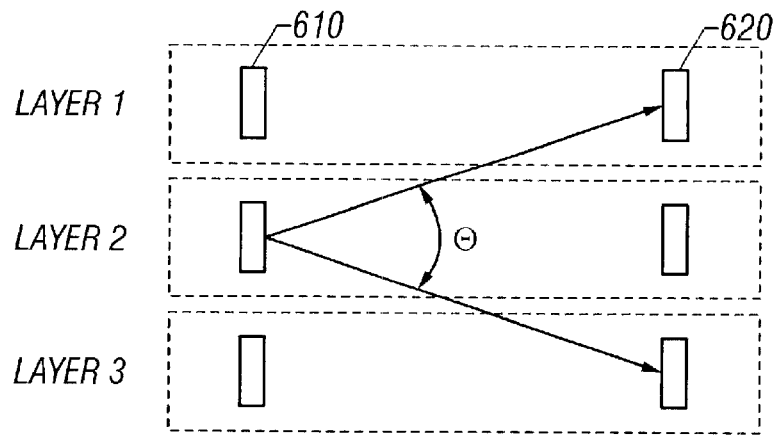
FIGS. 6A and 6B show examples of switching arrays with two or more layers of input and output fiber modules.

In the switching array 600 in FIG. 6, the I/O terminals of the I/O modules 401, 402 and the 2D switching elements may be placed substantially in the same plane to form an N×N switch layer. Two or more such layers may be stacked together in parallel to form a (MN)×(MN) switch network where M is the number of stacked layers. Similar to the requirement within each layer, the number of layers, M, is limited to the field of view of each switching element as illustrated in FIG. 6A (M=3) to allow any input from any layer to any output in the same layer or any other layer.

Figure 6B:
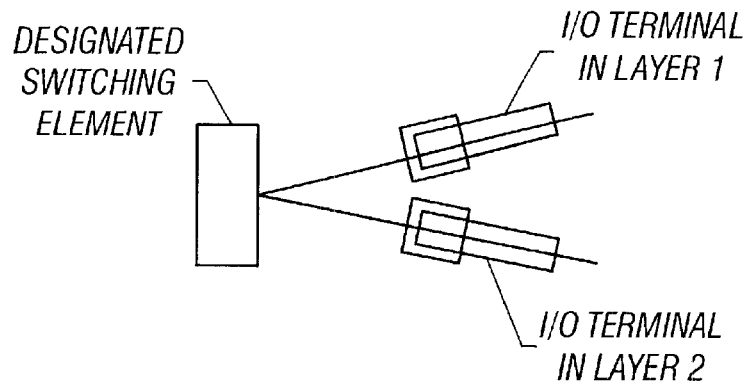

Alternatively, a single switching array 600 may be used to form an N×(MN) switch network when M layers of I/O modules 401, 402 are stacked in a non-parallel configuration so that fiber terminals at the same position in different layers can optically communicate with a designated switching element in the corresponding designated linear switching array. FIG. 6B illustrates an example of an N×(2N) switching network. The optic axis of the two terminals form an acute angle and intercept at or near the reflector of their designated switching element. When the designated switching element is oriented to direct a beam from one angled terminal to another linear array, the beam from the other angled terminal cannot be directed and hence is blocked. A receiving switching element in the other linear switching array, however, can direct the received beam to any one of the two corresponding angled terminals. Hence, the switching network is either a N-to-MN switch or a MN-to-N switch.

It is recognized that an adjustable reflector may have errors in its orientation. Such position errors may be caused by various factors, including but not limited to a change in the operating environmental parameters (temperature, humidity, vibrations, etc.), the inherent design, or aging of the combination of each reflector and the respective actuator. Hence, it may be desirable to implement a local optical position sensor in each reflector and a control unit to control the actuator to correct the error based on the error measurement obtained from the position sensor.

A local position sensing mechanism for each individual reflector may use a designated optical servo beam to sense the orientation of each reflector. Such a servo optical beam may be independent from a signal beam to be redirected by the reflector and have a completely different optical path from the signal beam. The servo optical beam may have a servo wavelength different from that of the signal beam so that the switching array is a "dual-color" or dichroic optical system.

Figure 7A:
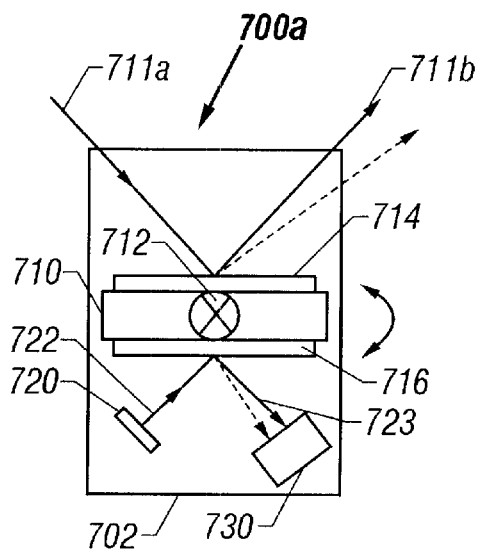
FIGS. 7A, 7B, 8, 9, 9A, 9B, 10, and 11 show exemplary local optical position sensing systems that monitor and control individual switching elements at their preset orientations.

FIGS. 7A and 72 show two different examples of suitable local optical position sensors for individual reflectors. FIG. 7A illustrates a switching element 700a which has a reflector 710 and an actuator 712 (e.g., a galvanometer) for controlling the reflector 710. A base 702 is used to support both the actuator 712 and the reflector 710. The actuator 712 may be operable to rotate the reflector 710 with respect to a single rotation axis or two orthogonal rotation axes. The reflector 710 has a reflective surface 714 to direct an input signal beam 711a to another direction along 711b. In general, the actuator 712 is operable to set two or more predetermined reflector orientations for switching. When the reflector 710 directs the input signal beam 711a to a direction 711c that deviates from a desired predetermined direction 711b, the actuator 712 can be adjusted to correct the deviation and hence to adjust the reflected beam back to the proper direction 711b. Such operation is possible when the orientation of the reflector 710 can be monitored by measuring a direction change in a reflection an optical servo beam 722 to detect the deviation.

The reflector 710 is designed to include a second reflective surface 716 that may be on the opposite side of the first reflective surface 714. A light source 720 and a position-sensing photodetector 730 are mounted on the base 702 to generate the servo beam 722 and to detect a position of the reflected servo beam 723, respectively. A LED or a diode laser may be used as the light source 720. The photodetector 730, which can be used in other embodiments of this disclosure, may include a sensing surface operable to determine a position of the reflected monitor beam 723. For example, a detector with an array of discrete photosensing areas or pixels such as CCDs or quad detectors may be used. In addition, a semiconductor position sensitive detector with a PIN photodiode may be used. The PIN photodiode may include one or two uniform, resistive surfaces to provide continuous position data of a beam. The relative positions of the reflector 710, the light source 720, and the detector 730 are arranged and calibrated so that the positions of the reflected servo beam 723 on the detector 730 can be used to measure the orientations of the reflector 710. This information is then used to generate a control signal to control the orientation of the actuator 712 by, e.g., changing the driving current to a respective coil if the actuator 712 is a galvanometer actuator.

Figure 7B:
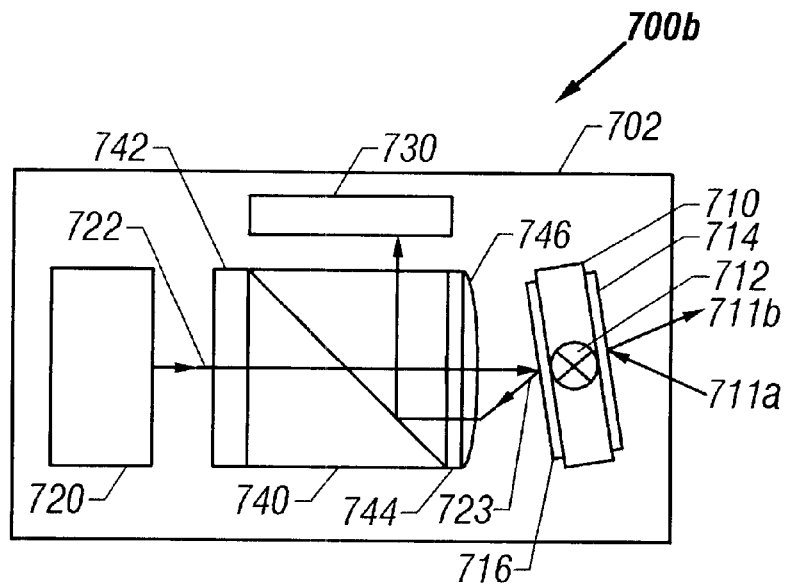

FIG. 7B shows a switch 700b with an alternative optical sensing mechanism. A polarization beam splitter (PBS) 740, a a quarter wave plate 744, and a lens 746 are used to guide the incident polarized servo beam 722 and the reflected servo beam 723. The servo beam 722 is linearly polarized upon entering the PBS 740 so that it transmits through the PBS 740. An optical element 742 may be placed between the light source 720 and the PBS 740 to modify the output beam from the light source 720 so that the beam is linearly polarized along a proper direction and is well collimated. The lens 746 then images the servo beam 722 onto the second reflective surface 716 of the reflector 710. The reflected servo beam 723 passes through the lens 746 and the rotator 744 for the second time so that its polarization is rotated by 90 degrees with respect to the original polarization. The PBS 740 then directs the reflected servo beam 723 to the photodetector 730 by reflection.

Figure 8:
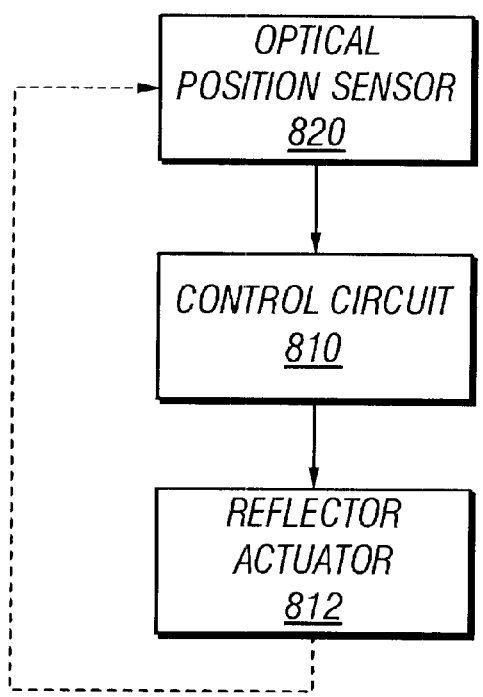

A control circuit 810 is generally implemented to control the actuator 712 in response to the position error signal from the position-sensing photodetector 730. FIG. 8 shows one embodiment of the active control mechanism in a switching array. An optical position sensor 820 as illustrated in the examples in FIGS. 7A and 7B and other implementations is used to monitor and measure the alignment error in the reflector 710. The control circuit 810 responds to the position error signal from the optical position sensor 820 to produce a control feedback signal to the respective one reflector actuator 812 (e.g., a galvanometer). The actuator 812 then adjusts the orientation of its reflector to reduce the error associated with that reflector.

Figure 9:
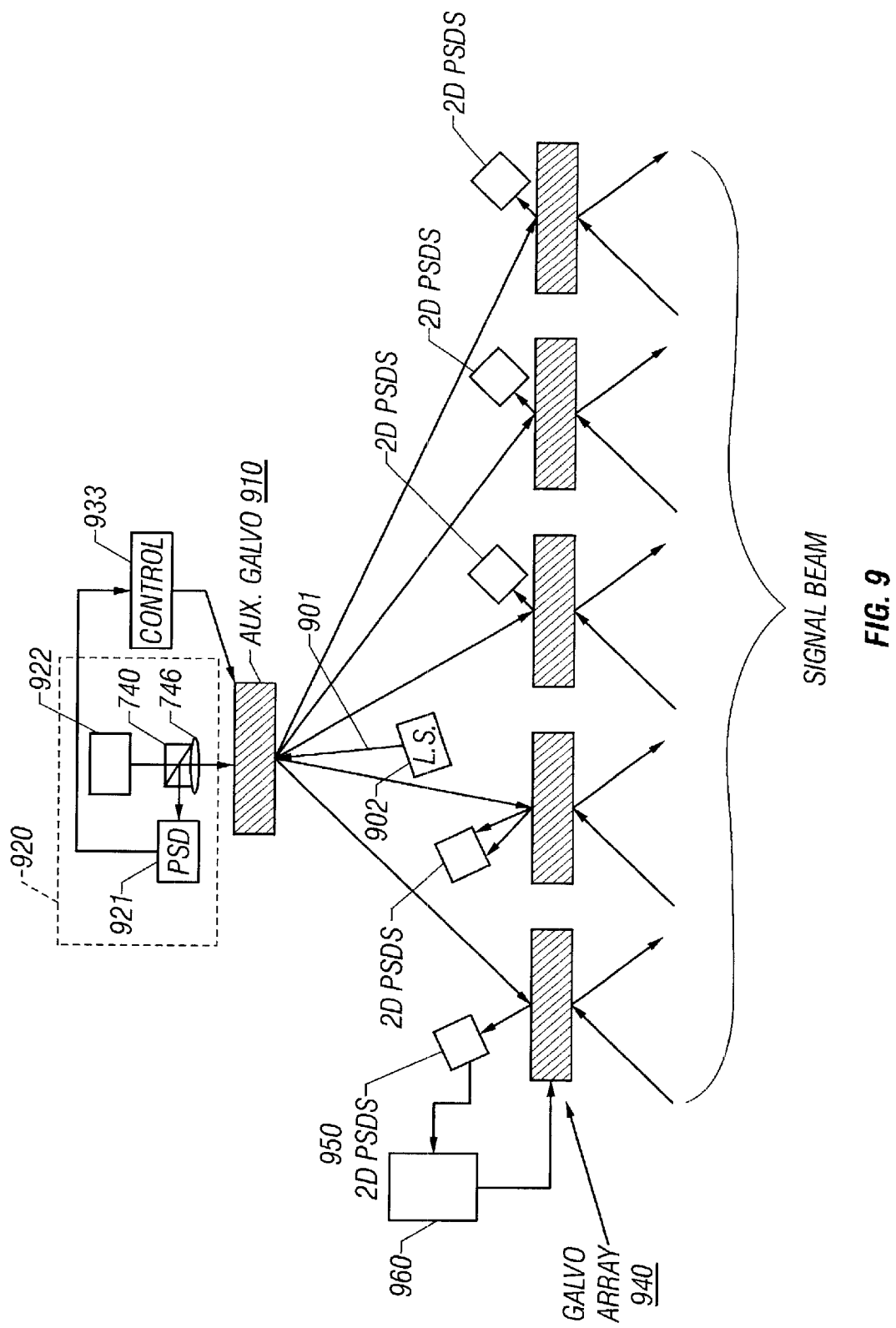

The above use of an independent servo beam may also be implemented in an optical position sensing system 900 shown in FIG. 9. The system 900 operates based on the control mechanism generally shown in FIG. 8. A switching array 940 has multiple of reflectors engaged to their respective actuators to switch input signal channels to various output channels as illustrated in FIGS. 1A, 1B, 1C, 4, 5, 6, 6A and 6B. A control circuit controls the actuators to set the reflectors in their desired switching positions and maintain the reflectors in such switching positions according to position sensing signals from position sensors. The position sensors here use an auxiliary reflector 910 engaged to an actuator and a position-sensing photodetector 910, both located at predetermined positions with respect to the switching array 940. The reflector 910 is "auxiliary" because it only directs an auxiliary servo beam 901 from a light source 902 for alignment control and monitoring and does not direct any signal beams. In particular, the auxiliary reflector 910 can be adjusted with respect to two orthogonal rotation axes to project the auxiliary servo beam 901 to any of the reflectors in the switching array 940, one at a time. The wavelength of the auxiliary servo beam 901 may be different from that of the signal beams that are switched by the switching array 940.

A position-sensing unit 920 is used to measure and set the orientations of the reflector 910 to preset positions to direct the servo beam 901 to the back surface of different reflectors in the switching array 940. The designs shown in FIGS. 7A and 7B may be used to implement the unit 920 which includes a position-sensitive detector 921 and a light source 922. The position of a beam from the light source 922 on the sensing surface of the detector 921 have a one-to-one correspondence with the orientations of the auxiliary reflector 910 and are used as a reference to set the orientations of the reflector 910. A control unit 923 uses the position signal from the detector 921 to control the orientations of the reflector 910. The auxiliary reflector 910 hence directs the servo beam 901 to the back surface of any reflector in the switching array 940.

A position-sensitive detector 950 is designated to each reflector in the switching array 940 to receive the reflected servo beam 901 from the back surface of the reflector. This detector is located at a second predetermined location with respect to the respective reflector to determine the direction of the reflected beam 901. This information is then used to determine the orientation of the respective reflector. A control unit 960 uses the output from the detector 950 to set and maintain the reflector at each desired switching orientation.

Figure 9A:
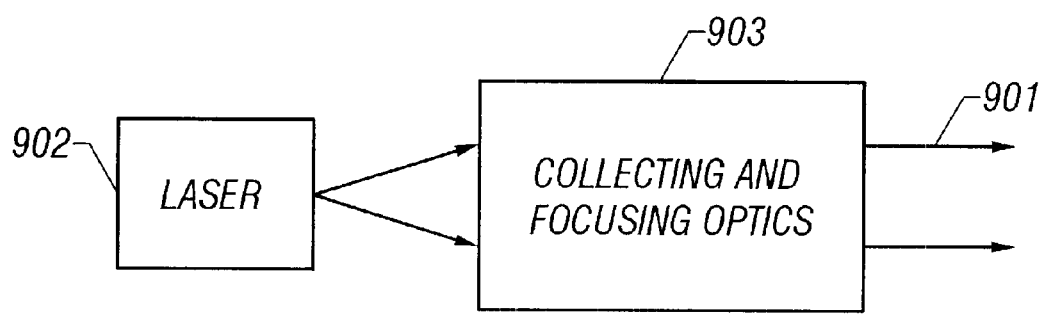
Figure 9B:
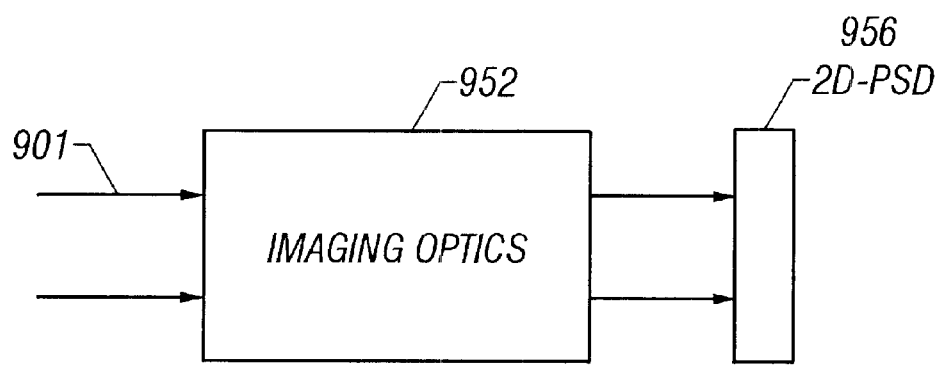

FIG. 9A further shows that a collimating optical element 903 such as a lens may be used to collimate the servo beam 901. FIG. 9B shows that an imaging optical element 952 may be used to image the reflected beam 901 onto the detector 950.

Figure 10:
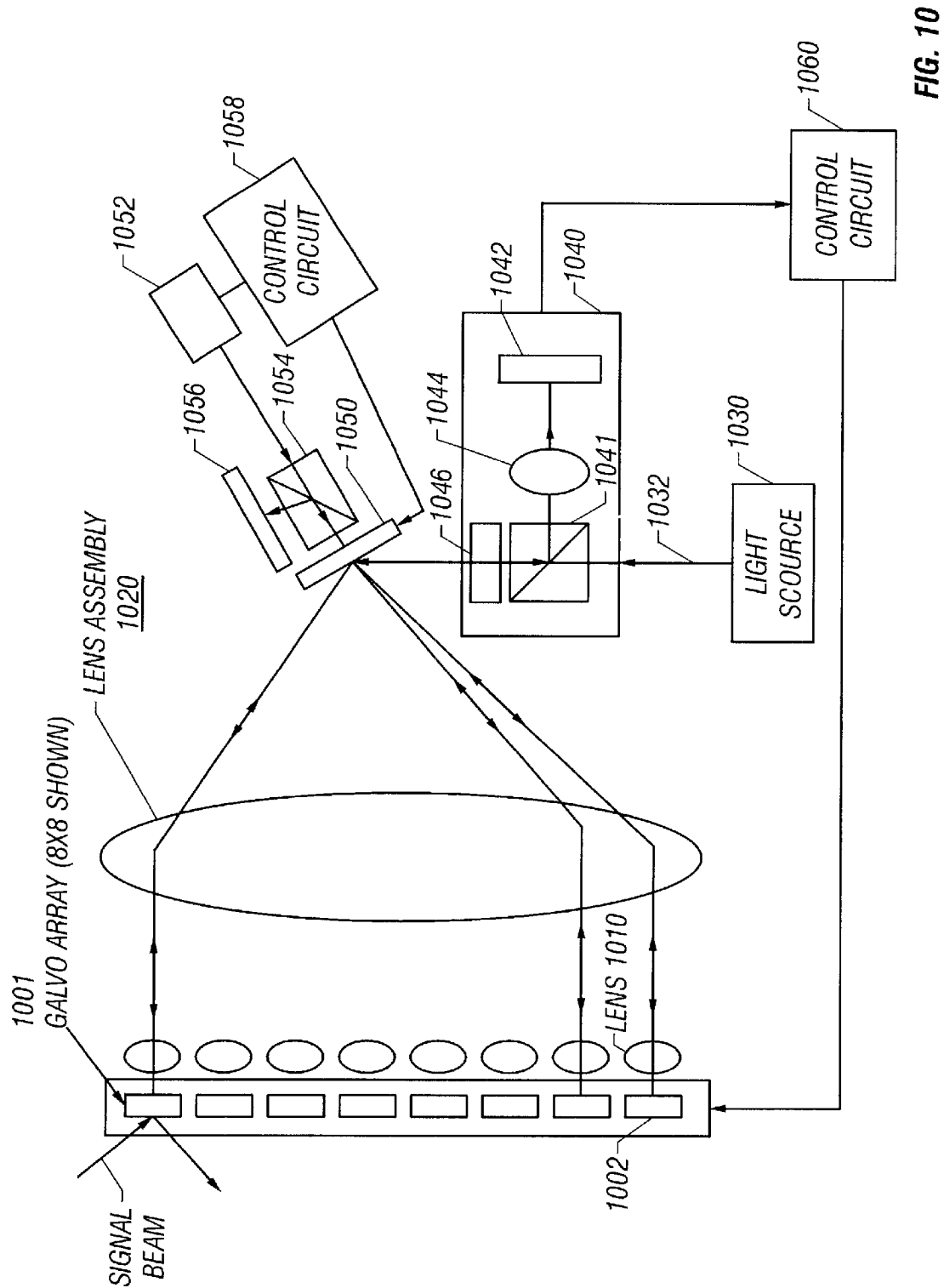

FIG. 10 shows another optical position sensing system 1000 that uses an auxiliary servo beam 1032 to monitor the orientation of each reflector 1002 in a switching array 1001. The servo beam 1032 is generated from a light source 1030 and is substantially collimated. An auxiliary steering reflector 1050 is positioned to direct the servo beam 1032 to the back reflective surface of each reflector 1002 in the switching array 1001 one at a time. A lens assembly 1020 is placed between the switching array 1001 and the steering reflector 1050 to couple the servo beam 1032 to the switching array 1001. Lenses 1010 are respectively positioned in the back of the reflectors 1002 to project the servo beam 1032 to the respective back reflective surfaces of the reflectors 1002. The lens assembly 1020 and the steering reflector 1050 are positioned so that the servo beam 1032 can be directed to different individual reflectors 1002, one at a time, by adjusting the steering reflector 1050 at preset orientations. The position sensors shown in FIGS. 7A and 7B may be implemented in the steering reflector 1050 to measure and control its orientations through an auxiliary control circuit 1058. For example, an optical position sensor with a beam splitter 1054, a position-sensing photodetector 1056, and a light source 1052 may be used as illustrated. The servo beam 1030, upon reflection at the back surface of each reflector 1002, is directed back to the steering reflector 1050 through the lens assembly 1020 for measuring the orientation of that selected reflector 1002.

An optical position sensor module 1040 may be placed to receive the reflected servo beam 1032 from the steering reflector 1050 to measure the orientation of the selected reflector 1002. In the example shown, the module 1040 includes a beam splitter 1041, a lens 1044, and a position-sensing photodetector 1042. The beam splitter 1041 directs the reflected servo beam 1032 to the sensing surface of the detector 1042. The beam splitter 1041 may be a polarization beam splitter and a quarter wave plate 1046 may be placed to make the polarization of the reflected servo beam 1032 to be orthogonal to the original servo beam 1032 so that the entire reflected servo beam can be directed to the detector 1042. The system 1000 can be calibrated to associate different orientations of each reflector 1020 to different beam positions on the sensing surface of the detector 1042 and hence a reflector control circuit 1060 can be used to control the reflector 1002 in response to the measured position of the reflected servo beam 1032 on the detector 1042.

Figure 11:
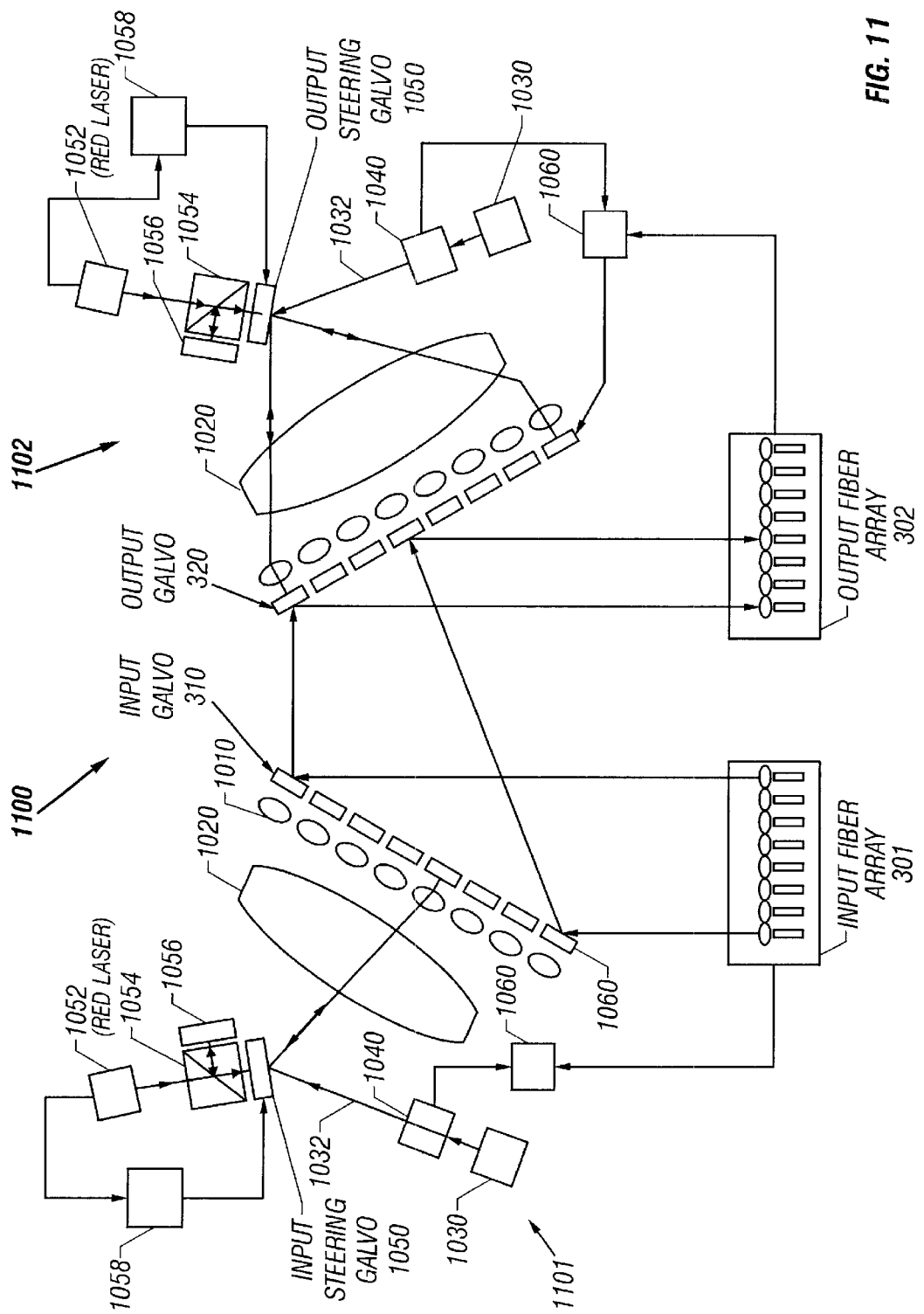

The above system 1000 in FIG. 10 may be incorporated into any linear array of reflectors to avoid using a position sensor in each individual reflector as illustrated in FIGS. 7A and 7B. For example, the system 1000 may be implemented in each linear switching array in the non-blocking switching arrays shown in FIGS. 4, 5, and 6. For example, FIG. 11 illustrates that the system 1000 in FIG. 10 may be used to provide position sensing and controlling to an actively controllable switching system 1100 based on the switching architecture 600 shown in FIG. 6. The orientations of the reflectors in linear switching arrays 610 and 620 are respectively controlled by the optical sensing systems 1101 and 1102. The two control circuits 1060 for the two different arrays 610 and 620 may be combined into a single control circuit.

In addition to optical position sensing locally at each reflector, a global optical sensing mechanism may be further implemented to optically monitor and measure the overall alignment of a signal beam that is controlled by two or more reflectors. The local optical sensing may be used to provide a coarse position control and the global optical sensing may be used to provide a fine position control. These two different optical position controlling mechanisms may be combined to enhance the accuracy of the optical alignment in a switching array. The global optical position sensing may be implemented by using a signal beam or a global servo beam independent of the signal beam. Different from the local position sensors in FIGS. 7A and 7B, the global optical sensing does not directly indicate the position errors of individual switching elements in the optical path of a signal beam. Rather, a parameter related to the beam position on the output fiber is measured to indicate the total effect of position errors from two or more switching elements in the path of the signal beam on the final position of the beam on the output fiber.

FIG. 12 shows one embodiment of a global optical position sensing system by measuring positions of the signal beams from the switching array 1210 at the receiving optical apertures of output terminals 1220. A position-sensing photodetector 1222 is placed in front of each receiving optical aperture of an I/O fiber 1220 to measure the position of the received signal beam with respect to the center of the fiber core. A position signal 1224 is generated by each photodetector 1222 to indicate the amount of the position offset at the respective receiving I/O fiber. A global control circuit 1230 responds to each position signal 1224 to generate an alignment control signal 1232 to control at least one of the two or more reflectors in the optical path of the signal beam associated with the position signal 1224 to reduce the alignment error at the respective I/O fiber 1220.

FIG. 12A is a side view along the line A—A' of the detector 1222 and the receiving I/O fiber 1220. FIG. 12B is a view along the line B—B' in the optic axis of the fiber 1220. In front of the optical receiving aperture of each I/O fiber 1220, a coupling lens 1223 is used to couple a beam into or out of the fiber core. The position sensing photodetector 1222 may include two bi-cell detectors 1222a and 1222b each with two sensing cells. The detectors 1222a and 1222b may be placed between the fiber aperture of the fiber 1220 and the lens 1223 in the opposing sides of the fiber core. Hence, the signal differences of (A+B) and (C+D) indicate the alignment error along one direction and the signal difference (A+B)−(C+D) indicates the alignment error along the orthogonal direction. The positioning signals 1224 include information on these signal differences and are fed to the global control circuit 1230 to control the relevant reflectors in the switching array 1210.

Figure 13:
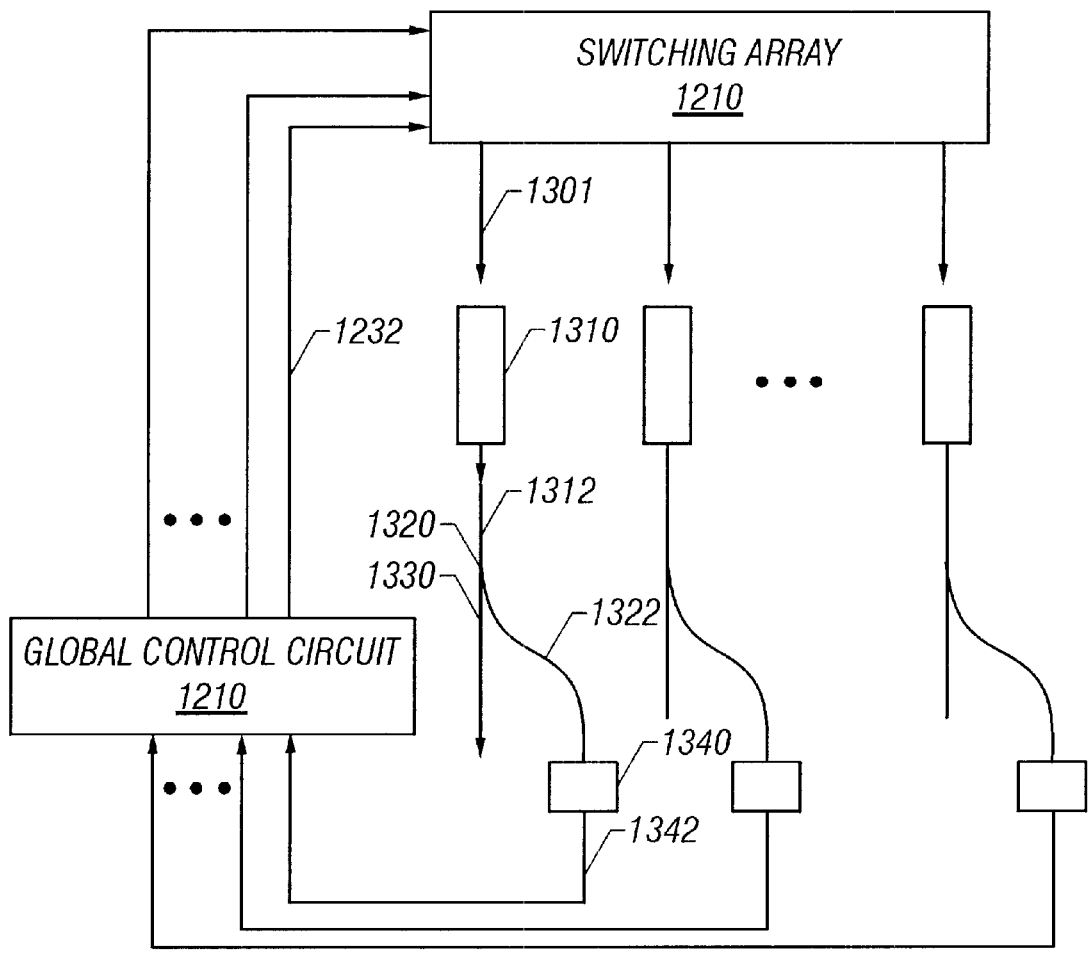

FIG. 13 shows another embodiment of a global optical position sensing system that measures signal beams at the receiving optical apertures of I/O fibers to determine optical alignment of the signal beams. A fiber coupler 1320 is used to tap a small fraction, e.g., several percent, of the received signal beam 1301 from the output fiber 1312, into a fiber 1322. The majority of the optical power 1312 remains in the output fiber 1330. A photodetector 1340 is coupled to the fiber 1322 to receive the taped optical power and to produce an indicator signal 1342. The greater the power coupled into the output fiber 1312 with coupling optics 1310, the smaller the overall alignment error in switching the signal beam 1301. The positions of the reflectors in the switching elements that reflect the beam 1301 in the switching array 1210 should be adjusted to maximize the output power in the output fiber 1312.

The global control circuit 1210 may be operable to offset the position of at least one of the reflectors that reflect the beam 1301 in the switching array 1210 to increase the signal 1342. The offsets in the position of one or more relevant reflectors may be in both orthogonal directions until the positions at which the signal 1342 reaches its maximum. A predetermined adjustment routine may be used to adjust the two or more reflectors in the path of the beam 1301 in the switching array. As illustrated in FIG. 13, the control circuit 1230 receives such an indicator signal from each output fiber and controls the actuators on the respective reflectors that reflect the output beam to that output fiber. Thus, all output power levels at their respective output fibers are maximized.

The above global position sensing techniques need the presence of the signal beams. Alternatively, a designated global servo beam may be generated at each input port of a switching array to substantially overlap with the corresponding signal beam throughout the switching array. Hence, in absence of signal beams, the reflectors in the switching array can still be aligned by using the global servo beams. The wavelength of the alignment beam may be selected to be different from that of the input signal beam and hence can be separated at a respective output port by using a wavelength-selective coupling element. In this case, the front reflector surface of the reflector in each switching element is dichroic to efficiently reflect both the signal and the servo beams. Either the power of the servo beam or its position at a position-sensing photodetector may be used to generate an indicator signal.

Figure 14:
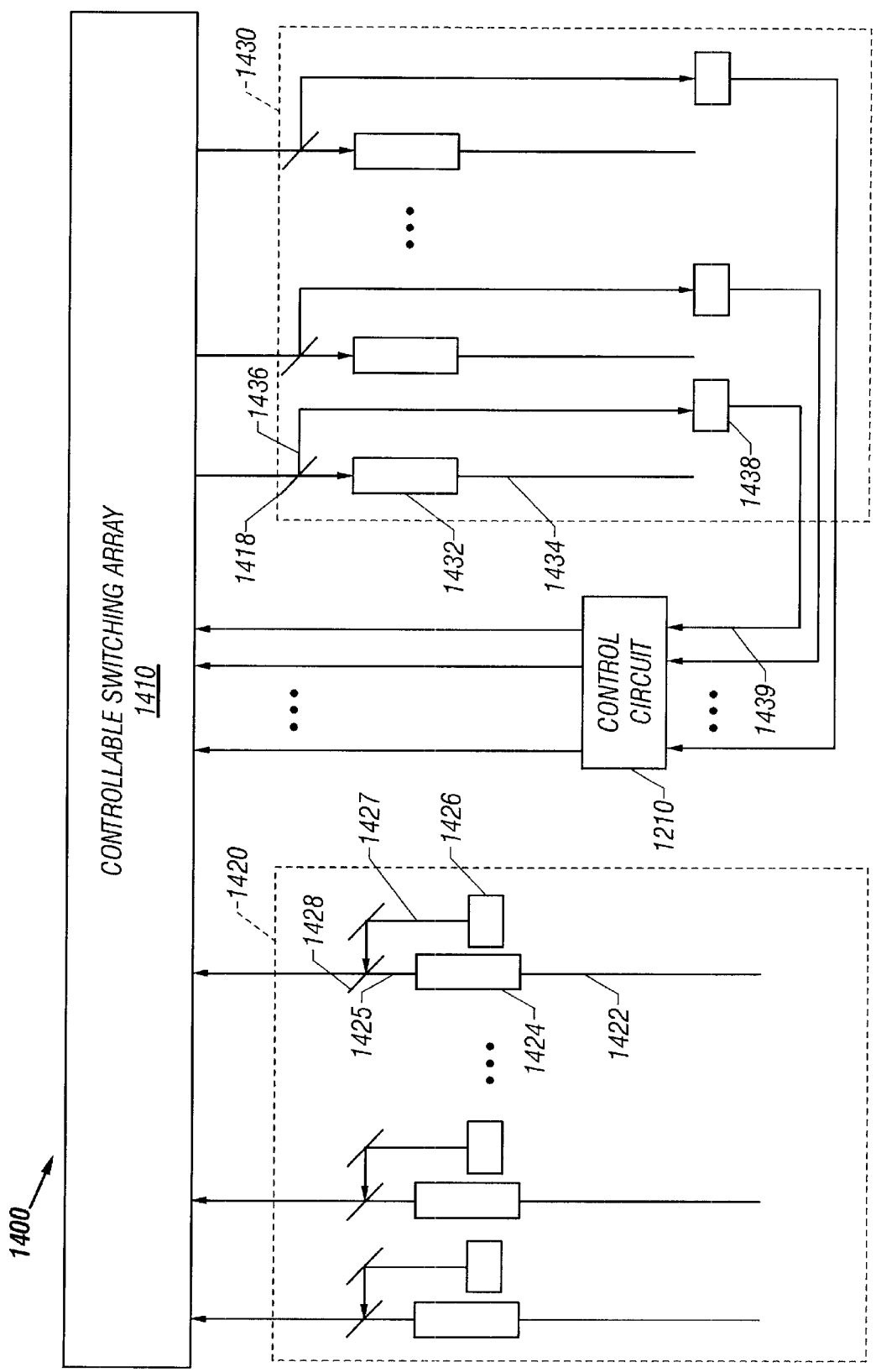

FIG. 14 shows a switching array 1400 that uses global servo beams that respectively track the signal beams to implement the global optical position sensing. The system 1400 includes a non-blocking switching array 1410, an input module 1420, an output module 1430, and a global control circuit 1210. At each input, an input fiber 1422 is coupled to a coupling optical module 1424 to direct an input beam 1425 in free space to the switching array 1410. A light source 1426, such as a LED or diode laser, is used to generate an alignment beam 1427 at a wavelength different from the input signal beam 1425. For example, the input signal beam 1425 may be at about 1550 nm while the alignment beam 1427 may be in the spectral range from about 500 nm to about 900 nm. A dichroic beam splitter 1428 is implemented to combine the beams 1425 and 1427 to co-propagate in the switching array 1410. Hence, the direction of the alignment beam 1427 at the output module 1430 represents the direction of the signal beam 1425. The positioning information of the alignment beam 1427 is therefore used to control the relevant reflectors in the switching array 1410.

At each output in the output module 1430, another dichroic beam splitter 1428 is used to separate the alignment beam 1427 from the input signal beam 1425. The input signal beam 1425 is directed into a coupling optical element 1432 and the proper output fiber 1434. The alignment beam 1427, on the other hand, is directed to a position-sensing photodetector 1438 such as a quad detector or an array of photosensing pixels. The photodetector 1438 is positioned and calibrated so that a reference location on its sensing surface can be used to represent a desired alignment for the signal beam 1425 into the output fiber 1434. An indicator signal 1439, representing a deviation from the reference location, is sent to the control circuit 1210 to adjust the relevant reflectors that reflect the beams 1425 and 1427.

Figure 14A:
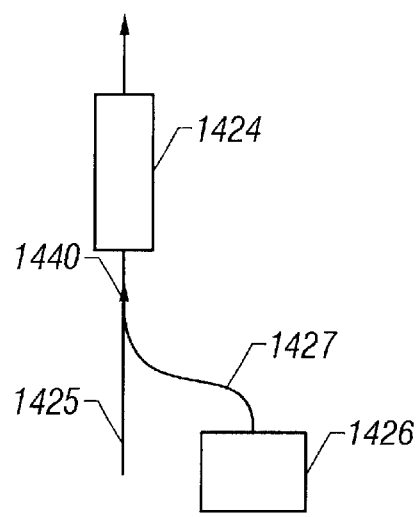

FIG. 14A shows another embodiment for combining the alignment beam 1427 with the input signal beam 1425. A wavelength-selective fiber coupler 1440 is used to couple the alignment beam 1727 into the input fiber 1422. The output of the coupling element 1424 thus has both the signal beam 1425 and the alignment beam 1427.

Figure 14B:
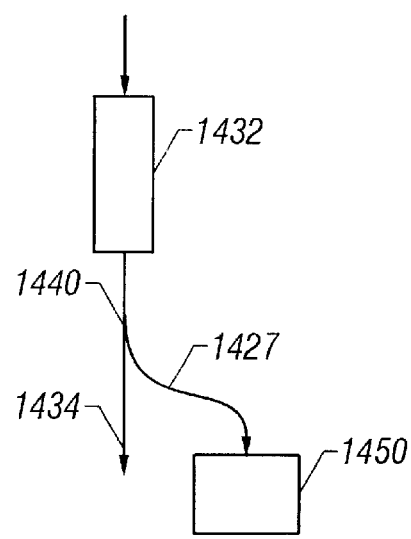

FIG. 14B also shows an alternative embodiment for each output in the output module 1430. The coupling optical element 1432 couples both beams 1425 and 1427 into the output fiber 1434. A wavelength selective fiber coupler 1440 is coupled to the output fiber 1434 to couple only the global servo beam 1427 out to a photodetector 1450 to measure its power. The control circuit 1210 adjusts the relevant reflectors to increase or maximize the output power of the global servo beam 1427. Different from the system in FIG. 13, the global servo beam 1427 has a wavelength different from the signal beam 1425. Hence, the global servo beam 1427 may be selected at a visible or near-infrared wavelength to reduce the cost of the light source 1426 and the detector 1450.

Figure 15:
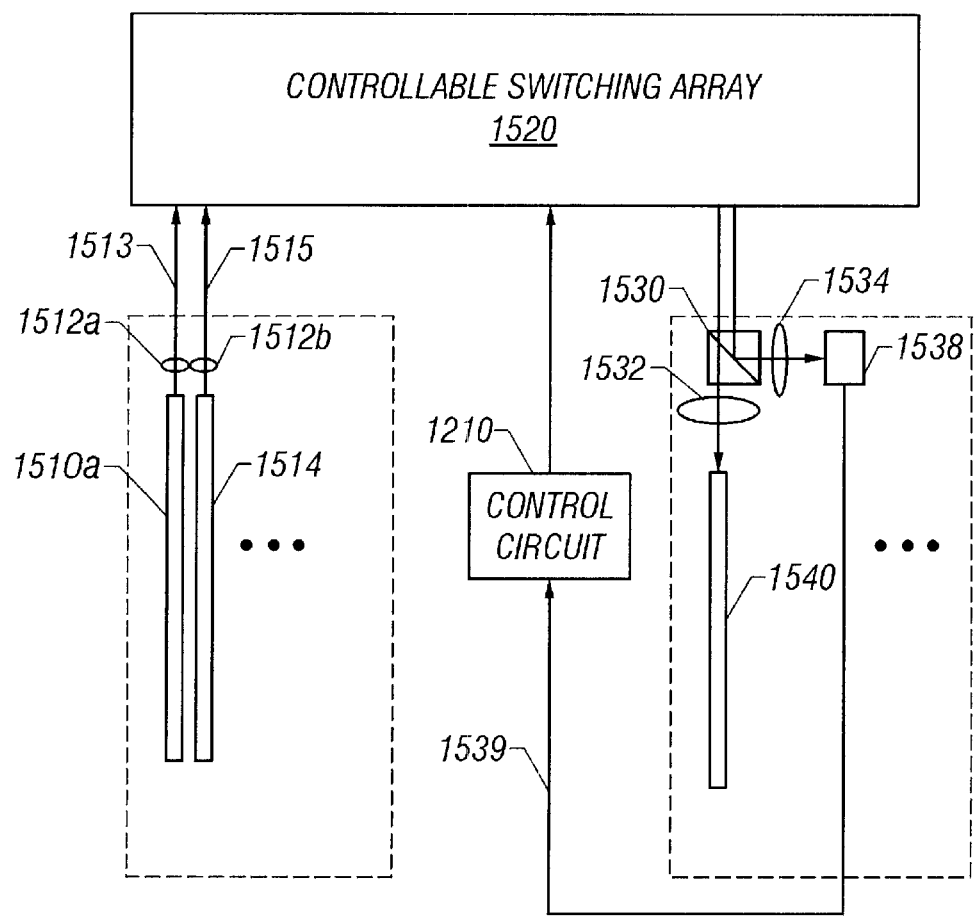

FIG. 15 shows yet another exemplary switching system that uses designated global servo beams to implement the global optical position sensing. Two separate input fibers 810 and 814 are arranged in parallel and close to each other to respectively carry an input beam 1513 and a servo beam 1515 at different wavelengths. A signal coupling optical element 1512a such as a lens or microlens is used to direct the signal beam 1513 into the switching array 1520. A servo coupling optical element 1512b is used to direct the servo beam 1515 in parallel to the signal beam 1513 to the switching array 1520. Hence, the beams 1513 and 1515 co-propagate along two slightly displaced and parallel optical paths in the switching array 1520 and are reflected by the same reflectors. At the output for each channel, a dichroic beam splitter 1530 is positioned to receive and split the beams 1513 and 1515 into two different paths. The signal beam 1513 transmits through the beam splitter 1530 and is coupled into the output fiber 1540 via a lens 1532. The servo beam 1515 is reflected by the beam splitter 1530 to a position sensing photodetector 1538 through another lens 1534. A reference location on the sensing surface of the detector 1538 is used to align the servo beam 1515 to hit on a desired location on the detector 1538. This alignment also aligns the signal beam 1513 with respect to the output fiber 1540. A position indicator signal 1539 generated by the detector 1538 is used by the control circuit 1210 to control the relevant reflectors that direct the beams 1513 and 1515. FIG. 15 only illustrates one input and its corresponding output. Other input and output channels may be constructed and operate similarly.

It is contemplated that, different optical position-sensing techniques may be combined together in a single switching array. For example, any of the local optical position sensing systems shown in FIGS. 7A, 7B, 9, 10, and 11 for coarse aligning of individual reflectors and the global position-sensing systems shown in FIGS. 12, 12A, 12B, 13, 13A, 13B, 14, and 15 for fine aligning of the overall optical alignment of each signal beam. A combination of such coarse and fine positioning sensing and controlling systems may provide operational advantages over either of the systems when used alone.

For example, the local optical position sensing can be used to monitor and control the orientation of each individual reflector to one or more preset orientations. Such local servo control, however, may not be adequate to ensure the proper alignment effectuated by two or more reflectors from an input terminal to a desired output terminal since various changes and variations in the switching system may cause the overall alignment of a particular optical path deviate from what was intended by the preset orientations. The global control, on the other hand, provides a measurement for the alignment error of an entire optical path but does not explicitly indicate the specific alignment error in each reflector in that optical path. The combination of the local and global optical position sensing mechanisms thus can be used to achieve robust optical switching operations with both local and global control.

The systems shown in FIGS. 13 and 14B may also be used to control the amount of optical energy of the signal beam that is coupled into the output fiber 1330 or 1434. Such variable optical coupling is done by adjusting one or more reflectors in the optical path of a signal beam to set its power at a desired value at the output fiber. Hence, the amounts of optical energy of different signal beams to their respective output fibers can be individually adjusted. This mechanism may be used to adjust the relative optical signal levels in different output fibers for, e.g., equalizing the signal strengths of different output WDM channels in a WDM system.

Figure 16:
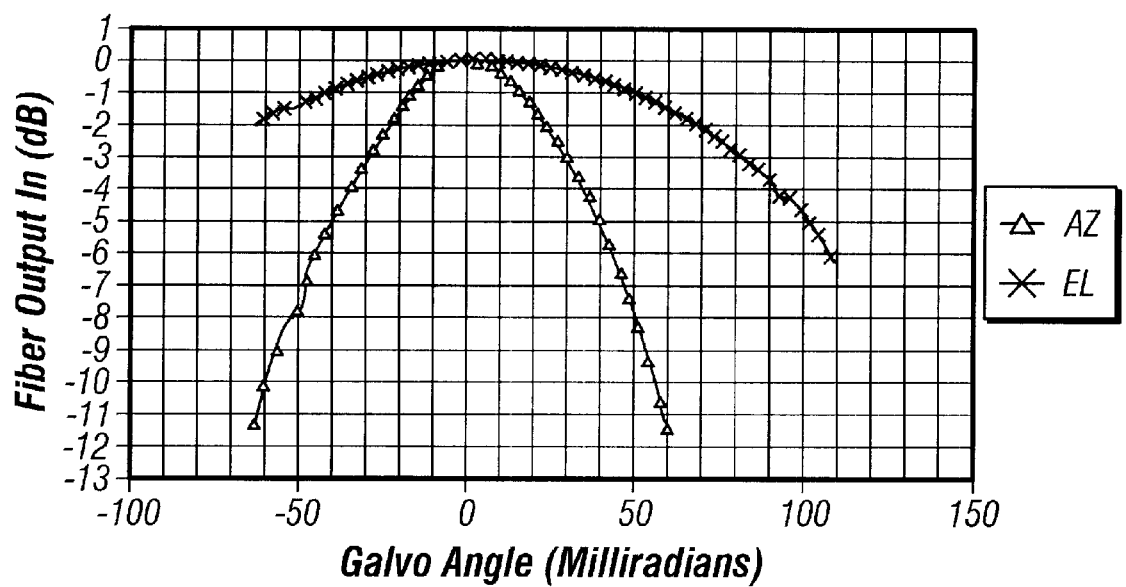
FIG. 16 shows measured optical power at a receiving optical fiber as a function of azimuth and elevation angles, respectively, in switching arrays shown in FIGS. 13 and 14B.

FIG. 16 illustrates how the optical power of a signal beam coupled into an output fiber varies with the either the azimuth angle or the elevation angle of one reflector in the optical path of the signal beam. The angle of the reflector where the coupling power is maximum is represented by 0 degree. This offset control is a feedback system that monitors the tap fiber amplitude, and modifies one or more reflectors in order to keep the tap amplitude at a preset constant level.

Although only a few embodiments are disclosed, variations and enhancements may be made. For example, although the local and global optical sensing mechanisms are described with specific reference to non-blocking optical switching arrays, it is understood that such optical sensing mechanisms may be applied to any controllable switching arrays including blocking switching arrays. For another example, the optical position sensing mechanisms may be applicable to optical switching elements other than reflector switches as long as the switching mechanism can be controlled to vary the direction of a beam. These and other embodiments and variations are intended to be encompassed by the following claims.

What is claimed is:

1. An optical switch, comprising:
   a switching element having a movable signal reflective surface to direct an optical signal beam by reflection to one or more switching directions, a separate servo reflective surface fixed relative to said signal reflective surface to reflect a separate servo beam incident to said servo reflective surface, and an actuator engaged to change orientations of said signal and said servo reflective surfaces;
   a servo light source to produce and direct said servo beam to said servo reflective surface of said switching element;
   an optical position sensor positioned to measure a position of said servo beam reflected from said servo reflective surface of said switching element to produce a position signal indicative of a deviation between an actual switching direction and a desired switching direction of said signal beam; and
   a control unit to respond to said position signal to control said switching element so as to reduce said deviation to direct said signal beam substantially in said desired switching direction.

2. The optical switch as in claim 1, wherein said signal beam has a wavelength different from a wavelength of said servo beam.

3. The optical switch as in claim 1, further comprising a base on which said switching element, said optical position sensor, and said light source are mounted, wherein said signal and said servo reflective surfaces are movable together relative to said base, and said servo light source and said position sensor are fixed to said base.

4. The optical switch as in claim 1, wherein said optical position sensor includes a photodetector which has discrete photosensing areas.

5. The optical switch as in claim 1, wherein said optical position sensor includes a photodetector which has a PIN photodiode with at least one uniform, resistive surface to provide continuous position data.

6. The optical switch as in claim 1, wherein said actuator is operable to rotate around a single rotation axis.

7. The optical switch as in claim 1, wherein said actuator is operable to rotate around two different rotation axes.

8. The optical switch as in claim 1, wherein said actuator includes a galvanometer or a MEMS actuator.

9. The optical switch as in claim 1, further comprising:
an optical terminal having an optical aperture to receive said signal beam directed from said switching element; and
another optical position sensor coupled to said optical terminal to measure a position of said signal beam on said optical aperture to produce a second position signal,
wherein said switching element is operable to respond to said second position signal to further control said actual switching direction of said signal beam to direct said signal beam at a desired position on said optical aperture.

10. The optical switch as in claim 9, wherein said second optical position sensor includes:
an optical coupler coupled to said optical terminal to split a portion of optical energy received by said optical aperture;
a photodetector to receive said portion of optical energy to produce a detector signal indicating an amount of said optical energy received by said optical aperture.

11. The optical switch as in claim 10, wherein said portion includes a global optical servo beam at a wavelength different a signal wavelength of a signal beam in said optical beam, and wherein said optical coupler is a dichroic optical coupler that separates said global optical servo beam from said signal beam.

12. The optical switch as in claim 10, wherein said portion is a part of said signal beam.

13. An optical switch, comprising:
a first array of switching elements and a second array of switching elements, each switching element operable to direct a signal beam from one direction to another direction, wherein each switching element in one of said first and said second arrays is operable to direct an incident beam to each and every switching element in another of said first and said second arrays;
a first optical position sensor located in each switching element in said first array to use at least a first optical servo beam to measure a property of a corresponding switching element in said first array to produce a first position signal indicative of a deviation between an actual switching direction and a desired switching direction of a first signal beam received by said each switching element in said first array; and
a second optical position sensor located in each switching element in said second array to use at least a second optical servo beam to measure a property of a corresponding switching element in said second array to produce a second position signal indicative of a deviation between an actual switching direction and a desired switching direction of a second signal beam received by said each switching element in said second array,
wherein each switching element in said first array is operable to reduce said deviation to direct said first signal beam substantially in said desired switching direction, and wherein each switching element in said second array is operable to reduce said deviation to direct said second signal beam substantially in said desired switching direction, and wherein an input signal beam is directed once by one switching element in said first array and once by a switching element in said second array to produce an output signal beam at a desired output direction.

14. The optical switch as in claim 13, further comprising:
a receiving optical terminal having an optical aperture to receive said output signal beam; and
a terminal optical position sensor coupled to said optical terminal to measure a position of said output signal beam on said optical aperture to produce a terminal position signal,
wherein at least one of said switching element in said first array and said switching element in said second array is operable to respond to said terminal position signal to further direct a direction of said output signal beam to a desired position on said optical aperture.

15. The optical switch as in claim 13, wherein each switching element includes a reflector that has a first reflective surface to reflect a signal beam and a second reflective surface to reflect a servo beam, wherein each of said first and said second optical position sensors includes:
a light source to produce said servo beam; and
a photodetector having a position-sensing surface to receive said servo beam reflected from said second reflective surface and to produce a position signal.

16. The optical switch as in claim 15, wherein each of said first and said second optical position sensor includes a beam splitter positioned to direct said servo beam from said light source to said second reflective surface and to direct said servo beam reflected from said second reflective surface to said photodetector.

17. The optical switch as in claim 16, wherein said servo beam is linearly polarized and said beam splitter is a polarization beam splitter, wherein each optical position sensor further includes a polarization rotator to rotate a polarization of said servo beam reflected by said second reflective surface by about 90 degrees from a polarization of said servo beam incident to said second reflective surface.

18. The optical switch as in claim 15, wherein each switching element includes an actuator engaged to said reflector to adjust an orientation of said reflector in two orthogonal directions.

19. The optical switch as in claim 18, wherein said actuator includes a galvanometer.

20. The optical switch as in claim 13, each switching element in said first and said second arrays is operable to adjust a direction of a beam in two orthogonal directions.

21. A method for controlling an alignment of an optical signal beam, comprising:
directing an optical signal beam through an optical path with a plurality of optical switches to reach a receiving optical terminal;
controlling each optical switch by using a local servo optical beam, independent from said optical signal beam, to measure a switching direction of each optical switch and adjusting said switching direction at a desired direction based on the measurement;

optically measuring a position of said signal beam on said receiving optical terminal to determine a position error; and adjusting at least one of said optical switches to reduce said position error.

22. The method as in claim 21, further comprising:

using a global servo beam, independent form said signal beam, to follow said optical path of said signal beam; and measuring a position of said global servo beam on said receiving optical terminal to determine said position error of said signal beam.

23. The method as in claim 21, wherein the position is measured by an amount of optical power of said signal beam received by said receiving optical terminal.

24. The method as in claim 23, further comprising:

adjusting at least one of said optical switches in said optical path to change said position of said signal beam on said receiving optical terminal so that the received optical power is substantially equal to a preset power level.

25. The optical switch as in claim 1, wherein said signal reflective surface and said servo reflective surface are parallel to each other and face opposite directions.

26. An optical switch, comprising:

a first array of optical ports to receive or output optical signals;

a second, separate array of optical ports to receive or output optical signals;

a first array of switching elements and a second array of switching elements spaced from each other and positioned between said first and said second optical ports to direct light between said first and said second optical ports, each switching element operable to direct a signal beam from one direction to another direction, wherein each switching element includes a local optical position sensor located in each switching element to use a separate local optical servo beam within said switching element to measure a property of said switching element to produce a local position signal indicative of a deviation between an actual switching direction and a desired switching direction of a signal beam received by said switching element;

an array of output optical position sensors respectively located at said first array of optical ports, one sensor per each port, to respectively measure a global position error in each signal beam received at each optical port; and a switch control unit to control each switching element in response to a corresponding local position signal from said switching element and a corresponding global position error of a beam that switched by said switching element.

27. The optical switch as in claim 26, wherein each switching element comprises:

a movable signal reflective surface to direct said optical signal beam by reflection;

a separate servo reflective surface fixed relative to said signal reflective surface to reflect said local optical servo beam incident to said servo reflective surface;

an actuator engaged to change orientations of said signal and said servo reflective surfaces; and a servo light source to produce and direct said local optical servo beam to said servo reflective surface.

28. The optical switch as in claim 27, wherein said actuator includes a galvanometer.

29. The optical switch as in claim 28, wherein said galvanometer has two different rotation axes.

* * * * *